(12) United States Patent
Wurth

(10) Patent No.: US 6,708,521 B2
(45) Date of Patent: Mar. 23, 2004

(54) COOLING OF ELECTRONICS IN AN ELECTRICALLY DRIVEN REFRIGERANT SYSTEM

(75) Inventor: Lukas M. Wurth, Ebly (BE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/345,892

(22) Filed: Jan. 16, 2003

(65) Prior Publication Data

US 2003/0154735 A1 Aug. 21, 2003

(30) Foreign Application Priority Data

Feb. 15, 2002  (LU) .................................................. 90 890

(51) Int. Cl.[7] ............................................. F25B 39/04
(52) U.S. Cl. ..................... 62/508; 165/80.4; 62/113; 62/259.2; 62/505
(58) Field of Search .................... 62/113, 114, 115, 62/118, 467, 498, 505, 508; 165/80.4

(56) References Cited

U.S. PATENT DOCUMENTS 4,720,981 A  *  1/1988  Helt et al. ..................... 62/113

6,047,557 A  *  4/2000  Pham et al. ................ 62/228.5

FOREIGN PATENT DOCUMENTS

| EP | 0933603 | 4/1999 |
| WO | 0050826 | 8/2000 |

* cited by examiner

Primary Examiner—Denise L. Esquivel
Assistant Examiner—Malik N. Drake
(74) Attorney, Agent, or Firm—Patrick M. Griffin

(57) ABSTRACT

An electrically driven refrigeration system (10), in particular for a vehicle air conditioner, comprises a compressor (12), an electric motor (14) for driving the compressor (12), an electronic controller (16) for controlling the motor (14), a condenser (18), an expansion device (20) and an evaporator (20). These elements are interconnected in such a way as to form a refrigeration circuit for circulating a refrigerant from the compressor (12) through the condenser (18), the expansion device (20) and the evaporator (22) back to the compressor (12). The electronic controller (16) is arranged in such a way as to be in thermal exchange relationship with the refrigerant at a point of the refrigeration circuit situated between the compressor outlet (26) and the condenser outlet (28).

5 Claims, 1 Drawing Sheet

COOLING OF ELECTRONICS IN AN ELECTRICALLY DRIVEN REFRIGERANT SYSTEM

FIELD OF THE INVENTION

The present invention generally relates to the cooling of electronics in an electrically driven refrigeration system, in particular in a vehicle air conditioner.

BACKGROUND OF THE INVENTION

It is known to cool the passenger compartment of an automotive vehicle by means of an electrically driven refrigeration system, also referred to as electric air conditioner. Such a refrigeration system typically comprises an evaporator disposed in the interior of the vehicle, a refrigerant compressor driven by an electric motor, a condenser located in the engine compartment and an expansion valve. Refrigerant is pumped by the compressor through the condenser, the expansion valve and the evaporator.

It will be noted that the electric motor of the compressor is sometimes controlled by an electronic controller, which generates some heat that needs to be dissipated.

In order to cool down the electronic controller of the electric motor, it has been proposed in WO 00/50826 to arrange the electronic controller so as to be in thermal exchange relationship with the refrigeration circuit between the exit of the expansion device and the compressor inlet, that is on the low pressure side of the system, where the refrigerant is at a temperature of a few degrees Celsius. If such an arrangement does indeed allow to cool the electronics with the refrigerant, which is at its lowest temperatures, it has the important disadvantage that the temperature of the refrigerant is increased. This results in an overall reduction of system performances, in particular having regard to efficiency and capacity.

In U.S. Pat. No. 4,720,981 it is has been proposed to arrange the electronic controller of the compressor motor in the refrigeration circuit between the condenser and the expansion valve so as to be in thermal exchange relationship with the refrigerant. This again impairs the cooling efficiency of the system since the refrigerant is heated by the electronic controller where it should normally be about ambient temperature, just before entering the low pressure side.

SUMMARY OF THE INVENTION

The object of the present invention is to provide an alternative way of cooling the electronic controller of the motor driving the compressor in such a refrigeration system. This object is achieved by a system as claimed in claim 1.

An electrically driven refrigeration system in accordance with the invention comprises a compressor, an electric motor for driving the compressor and an electronic controller for controlling the electric motor. The system further includes an expansion device, a condenser and an evaporator, which are interconnected with the compressor in such a way as to form a refrigeration circuit with a circulation of a refrigerant from the compressor through the condenser, the expansion device and the evaporator back to the compressor. According to an important aspect of the present invention, the electronic controller is arranged in such a way as to be in thermal exchange relationship with the refrigerant at a point of the refrigeration circuit situated between the compressor outlet and the condenser outlet.

Hence, in the present electrically driven refrigeration system, the electronic controller is arranged on the high pressure side of the refrigeration system, at a point of the refrigeration circuit after which the refrigerant will subsequently flow into the condenser. It follows that the extra heat absorbed by the refrigerant on contact with the electronic controller will be largely dissipated in the condenser. The refrigeration system of the present invention proves particularly advantageous over the refrigeration systems described in WO 00/50826 and U.S. Pat. No. 4,720,981, since the extra heat due to the electronic controller will not affect the temperature of the refrigerant in the low pressure side, whereby compressor efficiency in particular is barely affected. The present refrigeration system thus allows for cooling of the electronic controller and has an improved cooling efficiency.

A further advantage of the present refrigeration system is that the electronic controller is physically closer to the electric motor, which simplifies the wiring of the refrigeration system. This also means that, for compactness, the electronic controller may e.g. be integrated in a single housing comprising the compressor and its motor.

In a preferred embodiment, the refrigeration system comprises an auxiliary loop, which is associated with the condenser and connected thereto in such a way that at least part of the refrigerant flows out from the condenser into the auxiliary loop at a first point of the condenser and is reintroduced in the condenser at a second point downstream of the first point. The electronic controller is arranged so as to be in thermal exchange relationship with the refrigerant circulating in this auxiliary loop. In this embodiment, the electronic controller is cooled by the refrigerant, which has already lost part of the heat that was absorbed during the evaporation and compression processes. The remaining heat and the extra heat generated by the electronics will be rejected from the refrigerant in the second part of the condenser, i.e. upon its reintroduction at the second point. It follows that the refrigerant temperature downstream of the condenser is not at affected by the cooling of the electronic controller.

The heat exchange between the electronic controller and the refrigerant may result from direct or indirect contact. Indeed, the assembly of the controller and the refrigeration circuit may be such that the components to be cooled are directly in contact with the flow of refrigerant. This is mainly applicable in the automotive industry, which employs low voltages and particularly well insulated electronic and electric parts. Alternatively, the electronic controller casing may e.g. be mounted to be in close contact with the refrigerant piping between the compressor and the condenser, so that heat is exchanged through the walls of the casing and of the refrigerant piping. Another possibility is to mount the electronic components on a block of material comprising one or more internal channels in which the refrigerant is circulated.

In practice, it may be advantageous to take into account the extra heat to be dissipated in the condenser in the condenser specifications at the design stage of the refrigeration circuit. This means that a slightly bigger condenser than usual may be used to ensure an optimal operation of the refrigeration system.

It remains to be noted that the refrigeration system in accordance with the present invention may be used in various air conditioning applications such as e.g. in vehicle air conditioning systems (e.g. for cars, trucks and the like or agricultural and construction works vehicles) as well as in residential or commercial air conditioning systems.

Moreover, a heat pump system may be adapted in such a way as to function according to the refrigeration system of the invention when operating in the cooling mode.

BRIEF DESCRIPTION OF THE DRAWINGS

The present invention will now be described, by way of example, with reference to the accompanying drawings, in which.

DETAILED DESCRIPTION OF A PREFERRED EMBODIMENT

Figure 1:
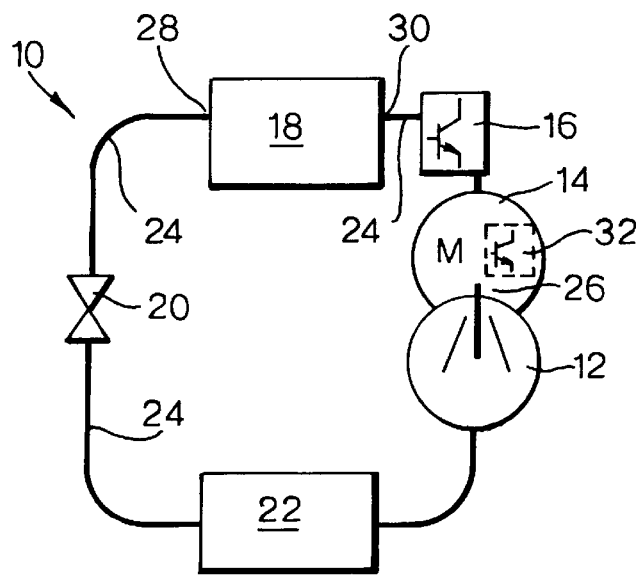
FIG. 1 is a diagram of a refrigeration system in accordance with a first preferred embodiment of the present invention.

FIG. 1 schematically shows a first preferred embodiment of an electrically driven refrigeration system 10 in accordance with the invention. The system comprises a compressor 12 driven by an electric motor 14. An electronic controller 16 is provided for controlling the motor 14. The compressor 12 may e.g. be a spiral compressor, which allows a continuous and pulsation-free conveyance of a non-represented refrigerant. The refrigeration system 10 further includes a condenser 18, an expansion device 20 and an evaporator 22. As illustrated in FIG. 1, the compressor 12, the condenser 18, the expansion device 20 and the evaporator 22 are connected by means of refrigerant piping 24, in such a way as to form a refrigeration circuit for continuously circulating a refrigerant from the compressor 12, through the condenser 18, the expansion device 20 and the evaporator 22, and back to the compressor 12.

When such a refrigeration system 10 is mounted on board of an automotive vehicle, the condenser 18 is normally located in the engine compartment and the evaporator 22 in the passenger compartment.

The refrigerant is compressed in the compressor 12 and subsequently flows to the condenser 18. In the condenser 18 the heat of the refrigerant is taken away by the external medium (normally outdoor air), whereby the refrigerant is partially condensed. Next, an expansion of the refrigerant takes place in the expansion device 20 and thereby a drop of pressure. The refrigerant expanded by the expansion device 20 then enters the evaporator 22 and absorbs the heat from the external medium (generally, the air entering the passenger compartment), thereby passing completely into the gaseous state. The gaseous refrigerant is finally sucked by the compressor 12 and starts over a new cycle. The part of the refrigeration circuit between compressor 12 and the expansion device 20 and including the condenser 18 forms the high pressure side of the refrigeration system 10. The part of the circuit between the expansion device 20 and the compressor 12 which comprises the evaporator 22 forms the low pressure side. It is also the part of the circuit with the lowest temperatures.

It will be appreciated that the electronic controller 16 is arranged in such a way as to be in thermal exchange relationship with the refrigerant at a point of the refrigeration circuit situated between the outlet 26 of the compressor 12 and the outlet 28 of the condenser 18. In fact, as shown in FIG. 1, the electronic controller 16 is arranged between the compressor outlet 26 and the condenser inlet 30. It follows that the extra heat absorbed by the refrigerant in contact with the electronic controller 16 will be dissipated during the passage of the refrigerant in the condenser 18. The extra heat due to the electronic controller 16 can thus be dissipated and the rest of the refrigeration circuit is not affected, which allows for an improved cooling efficiency of the system 10.

For compactness, the electronic controller 16 may e.g. be integrated in a single casing comprising the motor 12 and the compressor 14. This is illustrated in FIG. 1 by the electronic controller indicated by reference sign 32. It will be noted that in such an embodiment, the controller 32 is located between the compressor outlet 26 and the condenser 18, since the motor 14 is located downstream of the compressor 12.

Figure 2:
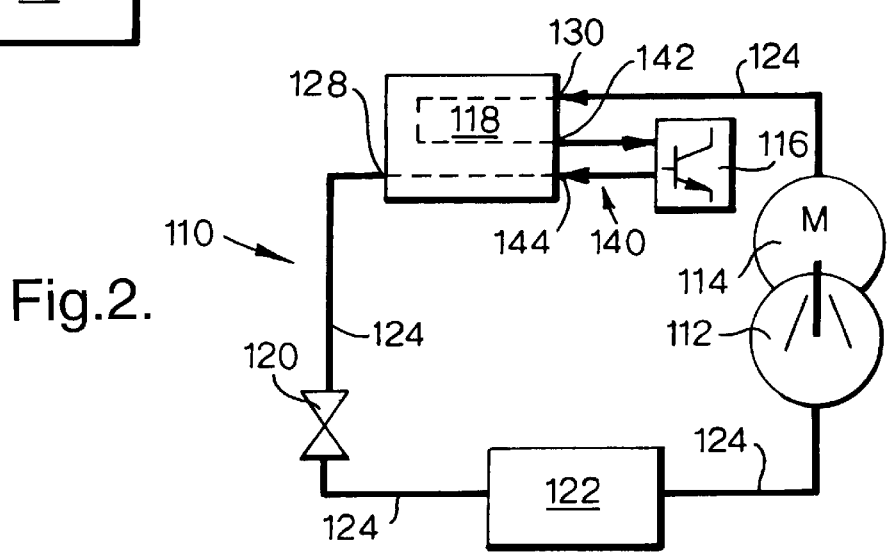
FIG. 2 is a diagram of a refrigeration system in accordance with a second preferred embodiment of the present invention.

Turning now to FIG. 2, another preferred embodiment of a refrigeration system 110 is shown. Similarly, the refrigeration system 110 comprises a compressor 112 driven by an electric motor 114 and an electronic controller 116 for controlling the motor 114, as well as a condenser 118, an expansion device 120 and an evaporator 122. The latter are connected by means of refrigerant piping 124, in such a way as to obtain a continuous circulation of refrigerant from the compressor 112, through the condenser 118 and the expansion device 120, to the evaporator 122, and back to the compressor 112.

It will be appreciated that the refrigeration system 110 further includes an auxiliary loop 140 associated with the condenser 118. This loop is connected at a first point 142 of the condenser where at least a part of the refrigerant flows out from the condenser 118 into the loop 140. At this first point 142, which is situated downstream of the condenser inlet 130, part of the compression heat of the refrigerant has already been dissipated in the condenser 118 and the refrigerant is thus partially cooled. The electronic controller 116 is arranged in this auxiliary loop 140 so as to be in thermal exchange relationship with the refrigerant circulating in the loop 140. The loop 140 ends at a second point 144 of the condenser 118, where the refrigerant is reintroduced into the condenser 118. This second point 144 is advantageously located upstream of the condenser outlet 128 so that the extra heat absorbed by the refrigerant in contact with the electronic controller 116, as well as the remaining heat from the evaporation and compression processes, can be dissipated in the condenser 118 upon reintroduction of the refrigerant at the second point 144. It follows that the refrigerant temperature in the remaining part of the refrigeration system 110 will not be affected by the extra heat absorbed by the refrigerant due to the cooling of the electronic controller 116.

Figure 3:
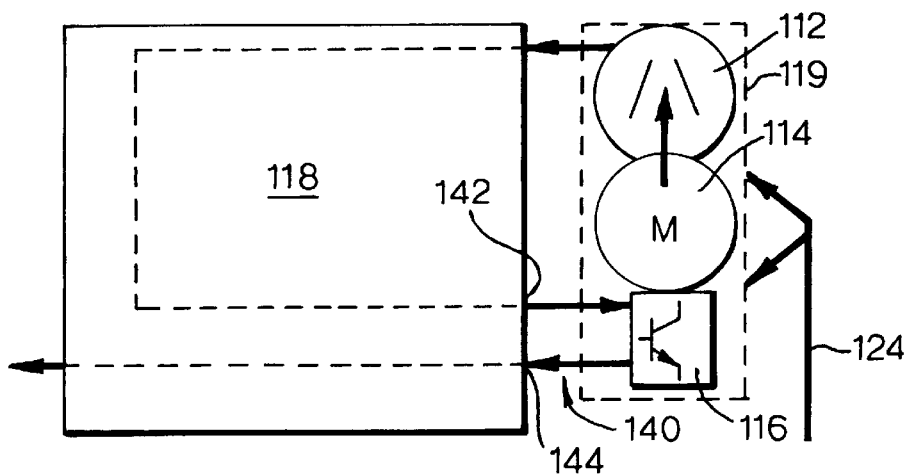
FIG. 3 is a diagram of a refrigeration system in accordance with a third preferred embodiment of the present invention.

In FIG. 3, a third embodiment of the present invention is shown, which corresponds to another layout of the refrigeration system 110 of FIG. 2. In FIG. 3, only the compressor 112, electric motor 114, electronic controller 116 and condenser 118 are shown. It will be noted that the compressor 112, the motor 114 and the electronic controller 116 are mounted in a single housing 119. Reference sign 124 indicates the refrigerant piping connecting the compressor/motor assembly to the evaporator (not shown). The refrigerant arriving from the evaporator is used to cool the compressor 112 and motor 114, is compressed and forwarded to the condenser 118.

As in FIG. 2, the auxiliary loop 140 is connected at a first point 142 of the condenser where at least a part of the refrigerant flows out from the condenser 118 into the loop 140, and is reintroduced into the condenser 118 at a second point 144, downstream of the first point 142. The electronic controller 116 is arranged in this auxiliary loop 140 so as to be in thermal exchange relationship with the refrigerant circulating in the loop 140.

This is a compact arrangement wherein the electronic controller is cooled by the refrigerant from the high pressure side of the refrigeration system whereas the compressor and its motor are cooled by the refrigerant on the low pressure side.

What is claimed is:

1. An electrically driven refrigeration system comprising a compressor, an electric motor for driving said compressor, an electronic controller for controlling said motor, a condenser, an expansion device and an evaporator, these elements being interconnected in such a way as to form a refrigeration circuit for circulating a refrigerant from said compressor through said condenser, said expansion device and said evaporator back to said compressor, characterised in that said electronic controller is arranged in such a way as to be in thermal exchange relationship with said refrigerant at a point of said refrigeration circuit situated between the compressor outlet and the condenser outlet.

2. The system according to claim 1, characterised by an auxiliary loop associated with said condenser, wherein:

said auxiliary loop is connected to said condenser in such a way that at least part of said refrigerant flows out from said condenser into said auxiliary loop at a first point of said condenser and is reintroduced in said condenser at a second point downstream of said first point; and said electronic controller is arranged so as to be in thermal exchange relationship with the refrigerant circulating in said auxiliary loop.

3. The system according to claim 1 or 2, characterised in that said refrigerant is in direct contact with the components of said electronic controller.

4. The system according to claim 1 or 2, characterised in that the components of said electronic controller are mounted on a block of material, said block of material comprising at least one internal channel through which said refrigerant is circulated.

5. The system according to any one of the preceding claims, characterised in that said electronic controller is integrated within a single housing comprising said compressor and said electric motor.

* * * * *